United States Patent [19]
Long et al.

[11] Patent Number: 6,145,064
[45] Date of Patent: Nov. 7, 2000

[54] METHOD OF EFFICIENTLY UPDATING HASHED PAGE TABLES

[75] Inventors: Timothy Merrick Long, Lindfield; Christopher Amies, Wilston; Graham Stoney, Ermington, all of Australia

[73] Assignees: Canon Information Systems Research Australia Pty Ltd, New South Wales, Australia; Canon Kabushiki Kaisha, Tokyo, Japan

[21] Appl. No.: 08/917,034

[22] Filed: Aug. 26, 1997

[30] Foreign Application Priority Data

Aug. 28, 1996 [AU] Australia ................................. PO1946

[51] Int. Cl.[7] ..................................................... G06F 12/02
[52] U.S. Cl. ........................... 711/158; 711/168; 711/206; 709/103
[58] Field of Search ...................... 711/207, 208, 711/168, 117, 118, 152, 158, 151, 206; 709/103

[56] References Cited

U.S. PATENT DOCUMENTS

| 5,497,480 | 3/1996 | Hayes et al. | 711/166 |
| 5,551,027 | 8/1996 | Choy et al. | 711/173 |
| 5,946,717 | 8/1999 | Uchibori | 711/206 |

*Primary Examiner*—Hiep T. Nguyen
*Attorney, Agent, or Firm*—Fitzpatrick, Cella, Harper & Scinto

[57] ABSTRACT

A method of updating, directing or moving page table entry values in a virtual memory management system. The method operates without requiring suspension of a search process looking for a predetermined page table entry value of a page table. In a first step, the method determines whether the current page table value is the predetermined page table entry value or whether the search process looking for a page table entry value is in progress. Then, the current page table entry value is deleted or moved in the event that the current page table entry value is not the predetermined page table entry value or in the event that the search process is not in progress. Next, the method waits until the search process has completed looking for the predetermined page table entry value or for a predetermined period of time before deleting or moving the current page table entry value, in the event that the current page table entry value is the predetermined page table entry value or in the event that the search process looking for a page table entry value is in progress.

26 Claims, 8 Drawing Sheets

Page Table

METHOD OF EFFICIENTLY UPDATING HASHED PAGE TABLES

FIELD OF THE INVENTION

The present invention relates to virtual memory management access in a computerized system and, in particular, to virtual-to-physical mapping of memory access for computerized systems.

BACKGROUND TO THE INVENTION

Modern processors typically provide hardware support for virtual memory systems by performing virtual to physical address mappings in hardware. Both the virtual and physical memory address spaces can be contemplated as a collection of "pages" of a predetermined size, often four kilobytes (4 kB). A set of mappings between virtual and physical memory pages which define the current virtual address space is stored in a data structure commonly called a "page table". Typically, entries in the page table further include access protection information and other control information such as software maintained flags and reference counts. The page table information is accessed quite frequently since it is used on substantially each memory reference. Unfortunately, the page table is typically too large to store on-chip within a central processing unit (CPU). Instead, a translation lookaside buffer (TLB) is used to cache the most recently used page table entries with the CPU.

When a reference is made to a virtual memory address, most mappings can be immediately performed via a TLB lookup. If a desired entry is not found in the TLB (often referred as a "TLB miss"), a page table lookup is performed to fetch the required information. If the desired entry is further not located within a page table in primary memory (eg. semiconductor random access memory—RAM), a "page Fault" occurs and an appropriate physical memory page is found, for example on a secondary memory system such as a hard disk, and loaded into primary memory for subsequent direct access by the CPU. An appropriate page table entry for the physical memory page is then loaded into the page table thus making the desired entry available. In a multiprocessor system, where a plurality of processors can access a page table, a first processor can be attempting a page table update while a page table lookup from a second processor is in progress, which can result in a possible conflict. A mechanism is normally required or set in place to resolve this possible conflict.

To directly index a page table utilizing a portion of the virtual memory address requires that the page table be as large as the indexing that is possible from the virtual page number. For example, if the twenty most significant bits of the virtual memory address are utilized as the virtual page number, an indexing of up to 1 Meg. of pages (1,048,576 pages) is possible. A page table accommodating more than a million virtual pages occupies a significant portion of memory. On a computer system running several applications, each having an associated page table, the total number of page tables could thus occupy a substantial part of the physical memory. It is therefore desirable to reduce the size of the page table.

Several techniques are available to reduce the page table size. One such technique is to limit the size of the page table to a predetermined size and if a request for an entry indexed by a virtual page number is outside the limits of the page table, an entry is made to the page table to account for the request. In this manner the page table is increased (or grown) to a required size, rather than being created to a size as large as that addressable by the virtual page number.

Another technique of reducing the page table size is to apply a "hashing function" to the virtual page number in such a manner as to reduce a virtual page number value to a smaller hashed index value which is used to index a smaller page table structure that addresses those physical memory pages in main memory.

The smaller page table resulting from the technique of applying a hashing function is often referred to as an "inverted page table" or "hashed page table". A hashing function typically maps substantially all virtual page numbers in a virtual memory system to a smaller subset of values herein referred to as hashed index values.

Consequently, applying a hashing function to a virtual page number can result in more than one virtual page number corresponding with a hashed index value. As a result a "hash collision" occurs, on an inverted page table lookup, when a current virtual address is hashed (ie. hash function applied) to obtain a hashed index value which is used to index an inverted page table entry having a virtual address, and the virtual address does not correspond to the current virtual address.

Similarly, when adding a new entry to an inverted page table, a "hash collision" occurs when a current virtual address is hashed to obtain a hashed index value which indexes an inverted page table entry currently occupied by a valid entry (ie. an entry having a valid flag set as described hereinafter).

A conflict arises if system software attempts to update the page table at the same time that a processor (or co-processor) of the system attempts a page table lookup resulting from a TLB miss. One solution to this conflict is to prevent page table lookups by locking out page table lookups while the table is being updated. However, locking the page table in this manner has adverse performance implications.

The above mentioned conflict is common to both multi-processor systems (since multiple processors may be doing a page table lookup at any time) and uniprocessor systems (since the page table lookup is such a fundamental operation that a lookup may occur even while executing the privileged operating system code which updates the page table itself).

For example, a system using a graphics co-processor is inherently a multiprocessor system. Further, requiring synchronisation of the multiprocessors in relation to page table accesses is undesirable because the graphics co-processor may need to be halted, in the synchronisation process, effectively slowing down the image processing.

SUMMARY OF THE INVENTION

In accordance with one aspect of the present invention there is provided a method of deleting or moving a current page table entry value of a page table in a computer system without requiring suspension of a search process looking for a predetermined page table entry value of the page table, said method comprising the steps of:

determining whether the current page table value is the predetermined page table entry value;

deleting or moving the current page table entry in the event that the current page table entry value is not the predetermined page table entry value; and waiting until said search process has completed looking for the predetermined page table entry value before deleting or moving the current page table entry value, in the event that the current page table entry value is the predetermined page table entry value.

In accordance with another aspect of the present invention there is provided a method of deleting or moving a current page table entry value of a page table in a computer system without requiring suspension of a search process looking for a predetermined page table entry value of the page table, said method comprising the steps of:

determining whether said search process looking for a page table entry value is in progress;

deleting or moving the current page table entry in the event that said search process is not in progress; and     waiting for a predetermined time before deleting or moving the current page table entry value, in the event that said search process looking for a page table entry value is in progress.

BRIEF DESCRIPTION OF THE DRAWINGS

A number of preferred embodiments of the present invention will now be described with reference to the drawings in which.

DETAILED DESCRIPTION OF THE EMBODIMENTS

Figure 1:
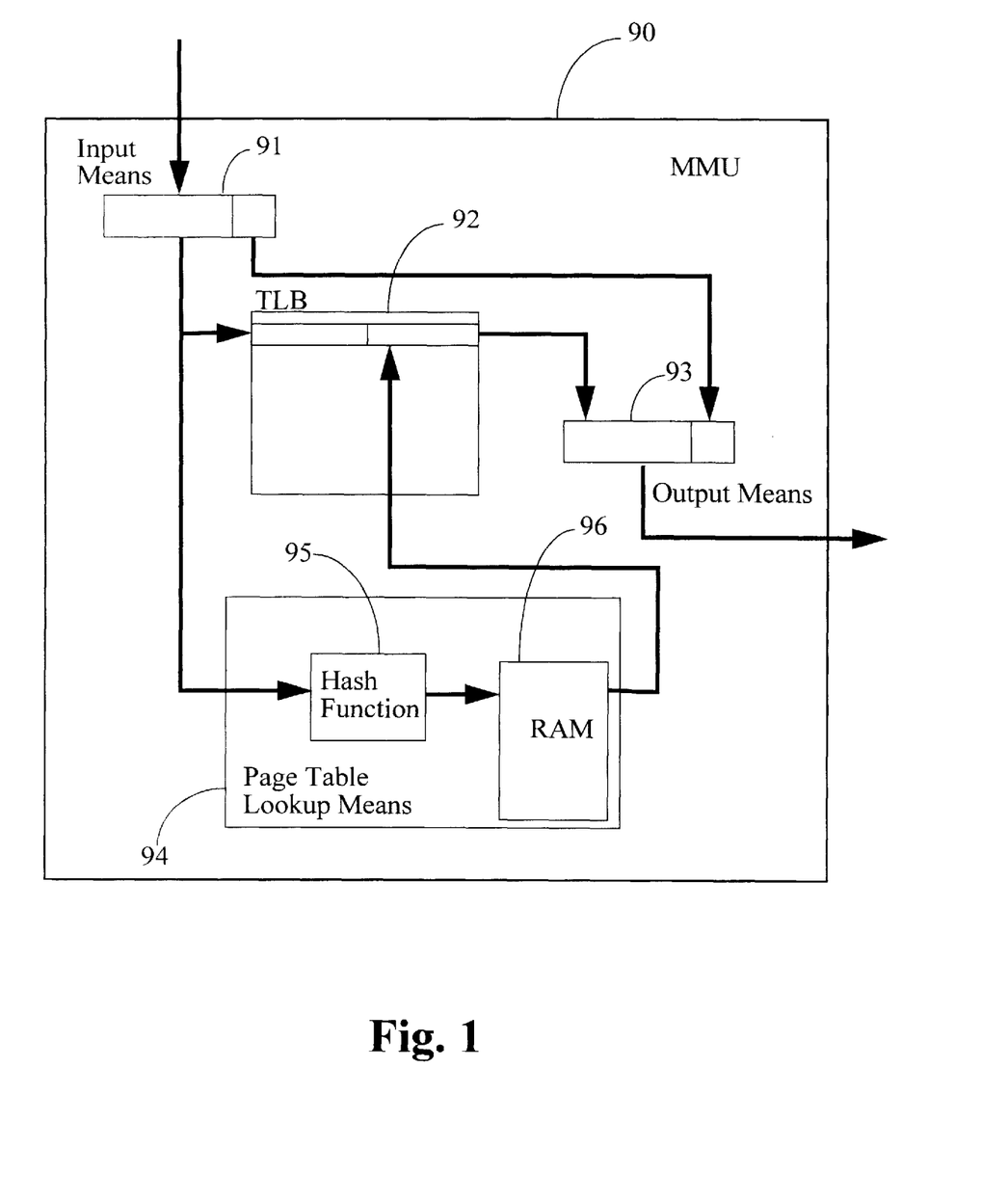
FIG. 1 shows a schematic block diagram representation of a memory management unit.
Figure 3:
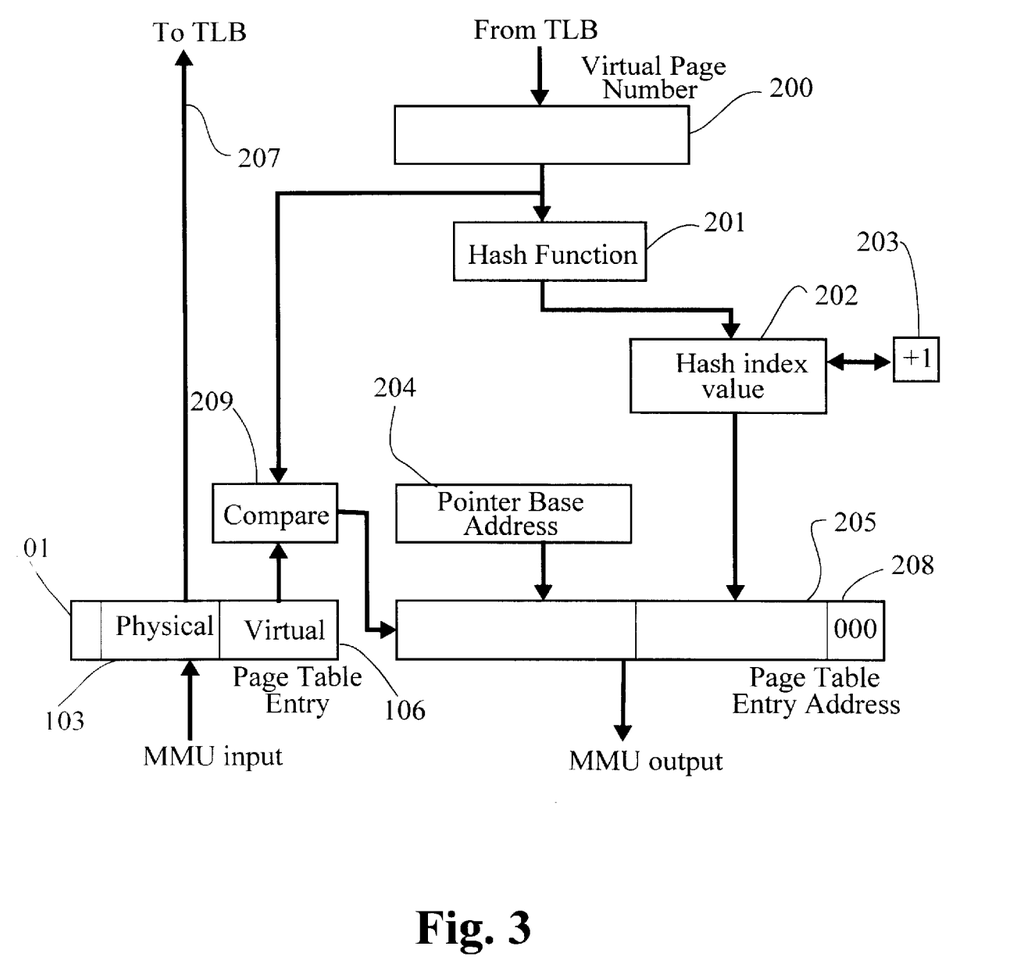
FIG. 3 is a schematic block diagram representation of a page table lookup operation in accordance with the preferred embodiment.

FIG. 1 illustrates the main components of a memory management unit (MMU) 90, comprising an input means 91 for receiving a virtual memory address, a translation lookaside buffer 92 (TLB), an output means 93 for outputting a physical memory address and a page table lookup means 94 adapted to lookup a virtual-to-physical memory map as hereinafter described with reference to FIG. 3.

The page table lookup means 94 includes a hash function means 95 adapted to manipulate at least a portion of the virtual memory address to provide an index to a page table (described herein). Preferably, the page table is stored in a random access memory (RAM) 96 of a computer system. Alternatively, page tables can be stored on a secondary memory device such as a hard disk device in which case, the page tables are loaded into the RAM 96 as required by the computer system.

Figure 2:
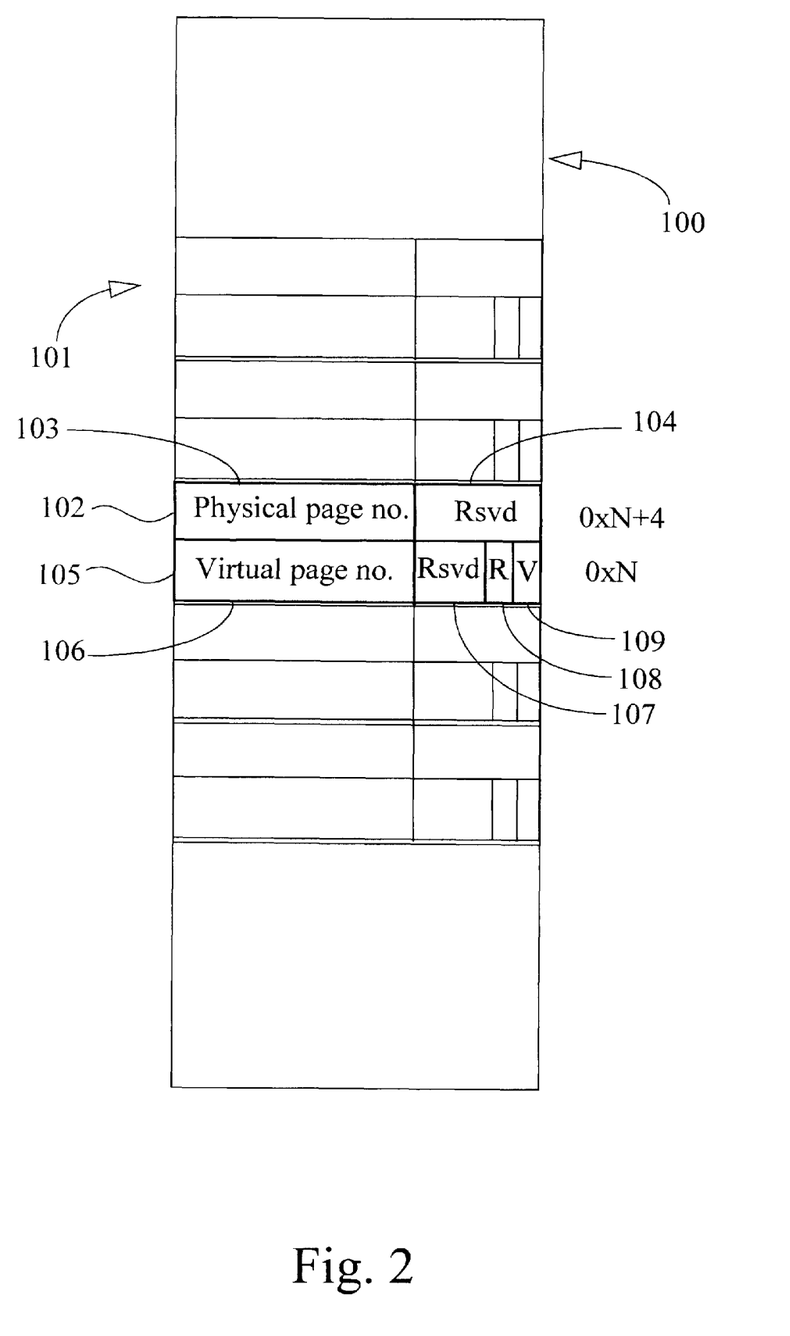
FIG. 2 illustrates a page table in main memory in accordance with the preferred embodiment.

Referring to FIG. 2, an inverted or hash page table 100 (hereinafter referred to as page table) is shown with a plurality of page table entries 101 comprising two, typically 32-bit, words. A first word 102 of the two 32-bit words comprises a physical memory page number 103 that together with an page offset number (not illustrated) form a physical memory address to desired data values stored in a computer system's memory (typically RAM). In this example, the physical memory page number 103 occupies less than the 32-bit word example of this embodiment and therefore the remaining bits are often left as reserved bits 104. A second word 105 of the two 32-bit words comprises a virtual memory page number 106, a reserved bit section 107, a read only flag 108 and a valid flag 109. A flag, such as the read only flag 108 and valid flag 109 for example, can be a single bit which can take on a value of 1 (set) or zero (unset). The read only flag 108, an example of which is an address access protection information flag, when set indicates that data in physical memory indexed by a page table entry 101 should not be overwritten. The valid flag 109 indicates whether the physical page number and virtual page number are a valid entry to the page table 100. There are three possible outcomes of a page table lookup resulting from a set and unset valid flag 109, hence the valid flag is best explained by way of example.

Figure 8:
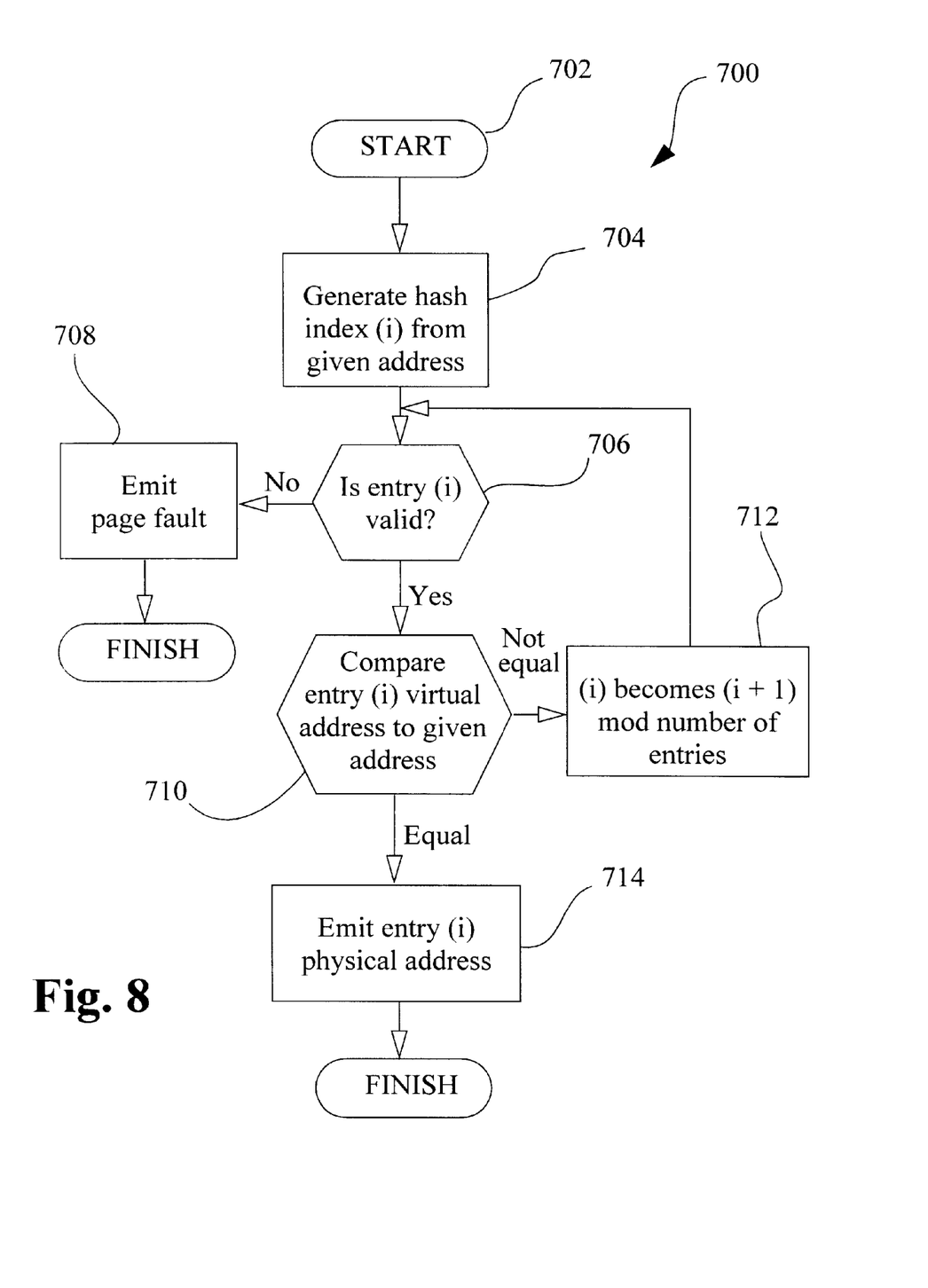
FIG. 8 is a flow chart depicting page table lookups described in FIGS. 2 and 3.

Referring also to FIG. 8, a page table lookup process 700 is shown having an entry point 702 which is followed by the generation of a hash index (i) at step 704 from the given address, thus revealing a page table entry 101. If the valid flag 109 of the page table entry 101 is unset as determined at step 706 and the page table entry 101 is accessed as a result of a page table lookup then a "page Fault" error has occurred seen at step 708, which will be described hereinafter and which concludes the look-up. On the other hand, if the valid flag 109 is set and the page table entry 101 is accessed as a result of a page table lookup, then the virtual memory page number 106 of the page table entry 101 is compared at step 710 to a virtual page number of a virtual memory address utilized in the page table lookup, being the desired virtual memory address for which a virtual to physical memory address mapping is sought (a virtual-to-physical map being a number pair including a virtual page number and a physical page number). Upon comparison, if the virtual memory page number 106 of the page table entry 101 does not correspond to the virtual page number of the desired virtual memory address, then the index (i) to the page table entries 101 is incremented at step 712 to become (i+1) and subsequent entries are systematically searched and a virtual page number of each corresponding page table entry is compared with the desired virtual page number until a match is found or until a page table entry having an unset valid flag is encountered. In the event that the desired virtual page number is found in a page entry table 101, a physical memory address is returned 714. However, upon a page table lookup, if a page table entry 101 with an unset valid flag is encountered first, then a page fault occurs.

In recent modern computer systems, a memory management unit typically includes a "Translation Lookaside Buffer" (TLB) which is a table of virtual to physical address mappings and is usually a small size table of, often, most recently used entries of a page table. Each TLB entry comprises substantially similar information as an entry of a page table and the TLB is substantially a subset of most recently used entries of the page table. Often a TLB includes substantially the same address protection information included in a page table entry. The TLB is constantly updated in accordance with a need of the hardware system request for any one virtual-to-physical address translation. A TLB is typically the first table searched when a hardware system requests a virtual to physical address translation. Since the TLB is a subset of a total number of virtual to physical map entries included in a page table, sometimes a request by the hardware system for a desired virtual-to-physical memory map cannot be found in the TLB and, as a consequence, a page table lookup must be initiated. When a desired virtual to physical map is not found in the TLB, that is if no entry of the TLB, with a valid flag set, includes a virtual page number that matches a desired virtual page number, then a "TLB miss" occurs that initiates a page table lookup.

A page table lookup resulting from a TLB miss is now described with reference to FIG. 3. The flowchart of FIG. 8 also outlines comparable steps but does not include all the detail of the following. In a page table lookup, a virtual page number 200 from a virtual memory address for which a virtual to physical mapping is sought (ie. a physical memory address is sought corresponding to the virtual memory address), and has not been located in a TLB, the virtual page number 200 is subjected to a "hash" function 201. The output, of the hash function 201 applied to the virtual page number 200, is referred to herein as a hashed index value 202 which is used in identifying a page table entry. A page table address 205 is constructed, in this example, by concatenating a pointer base address value 204 as the upper most significant bits, the hash index value 202 as the intermediate bits and three null bits 208 (ie. 000) as the lowest significant bits to provide the address 205 to an entry of the page table (ie. a page table address). The three null bit 208 entries concatenated as the lowest significant bits, allow the page table address 205 to be used as a byte address for the page table entry.

A page table entry 101 is read, starting at the address pointed to by a current page table address 205, preferably a word at a time. The virtual memory page number 106 of the page table entry 101 is compared 209 with the virtual page number 200 which resulted in a TLB miss. If the page numbers (106, 200) are equal, that is, matching page numbers (106, 200) are found, the page table entry 101 is written to the TLB. A subsequent search of the TLB for the virtual page number 200 would not result in a TLB miss. In the event that the page numbers (106, 200) are not equal (ie. a "hash collision" occurs), the current hash index value 205 is repeatedly incremented 203 to a next page table entry and a virtual memory page number of each of the next page table entries is compared 209 with the desired virtual page number 200. The hash index value 205 is allowed to increment 203 until the comparison step 209 finds matching virtual page numbers 106, 200 or until a page table entry 101 having an unset valid flag 109 is encountered. In the event that matching virtual page numbers are found, a corresponding physical address 103 of the page table entry 101 having the matching virtual page number 106 is forwarded 207 to the TLB. The corresponding physical address 103 is written to the TLB and associated with the desired virtual page number 200 to provide a required virtual to physical translation in the TLB.

If necessary, when the incrementing reaches the last entry of the page table not having found the desired match, the incremental search for the desired match is initiated at the beginning of the page table hence "wrapping-around" until either the desired match is found or an entry having an unset valid flag is encountered, which ever is first. The valid flag 109 of a page table entry is checked before the comparison 209 and if the valid flag 109 is unset a page fault results, and the page table lookup is consequently terminated. Since searching the page table is allowed to wrap-around from the end of the page table to the beginning of the page table, at least one entry of the page table is usually maintained with a valid flag unset to ensure the search can terminate should a desired page table entry not be found. Similarly when a page table entry is to be updated, removed or moved from a current page table location to another location of the page table, a page table lookup is performed substantially as described with reference to FIG. 3 to determine which of the plurality of page table entries 101 is to be updated, removed or moved respectively.

Figure 9:
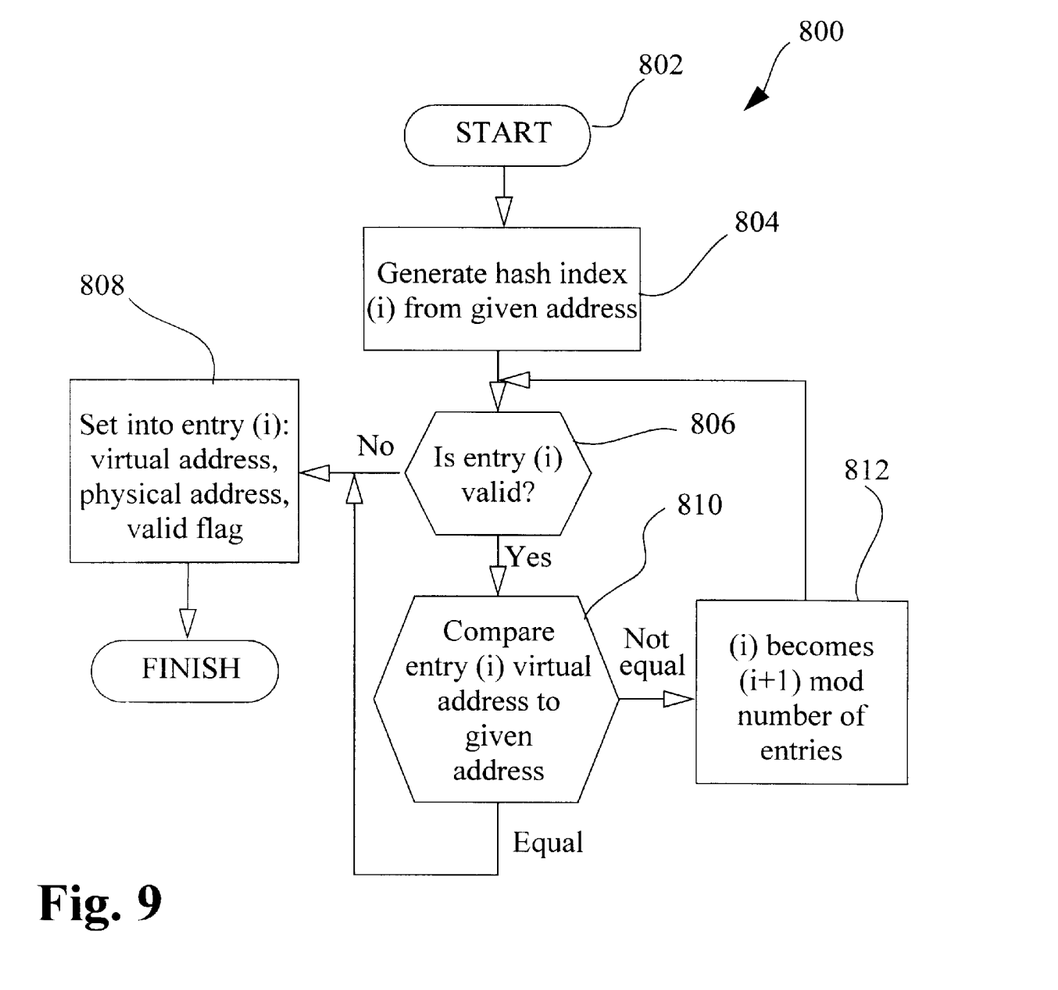
FIG. 9 is a flow chart depicting a page table insertion using the arrangement of FIGS. 2 and 3.

A page table insertion, that is a page table entry inserted or added to a page table, is performed in a manner substantially as described above with reference to a page table lookup however an unset valid flag 107 is now not an indication of a page fault, but rather an indication that a page table entry may be inserted (or overwritten). Further, a page table insertion is not necessarily a result of a TLB miss but a specific request by the software or hardware system to insert or augment the page table. A depiction of this is shown in FIG. 9 as a process 800 having an entry point 802. The hash index value (i) is generated at step 804 to provide the virtual page number in the TLB. At step 806 the index is considered and if a TLB miss occurs, step 808 sets the virtual address as that of the index thus performing the insert. Preferably, the first word 102 (comprising the physical memory address) of a page table entry is updated or inserted before the second word 103 (comprising the virtual memory address) to prevent the system software or hardware from using the page table entry before a complete update is performed. If step 806 results in a valid index, a TLB "hit", then step 810 compares the virtual address to that given for the insertion. If equal, step 808 is again invoked to complete the insertion. If not equal, step 812 increments the index and returns control to step 806.

Figures 4, 5:
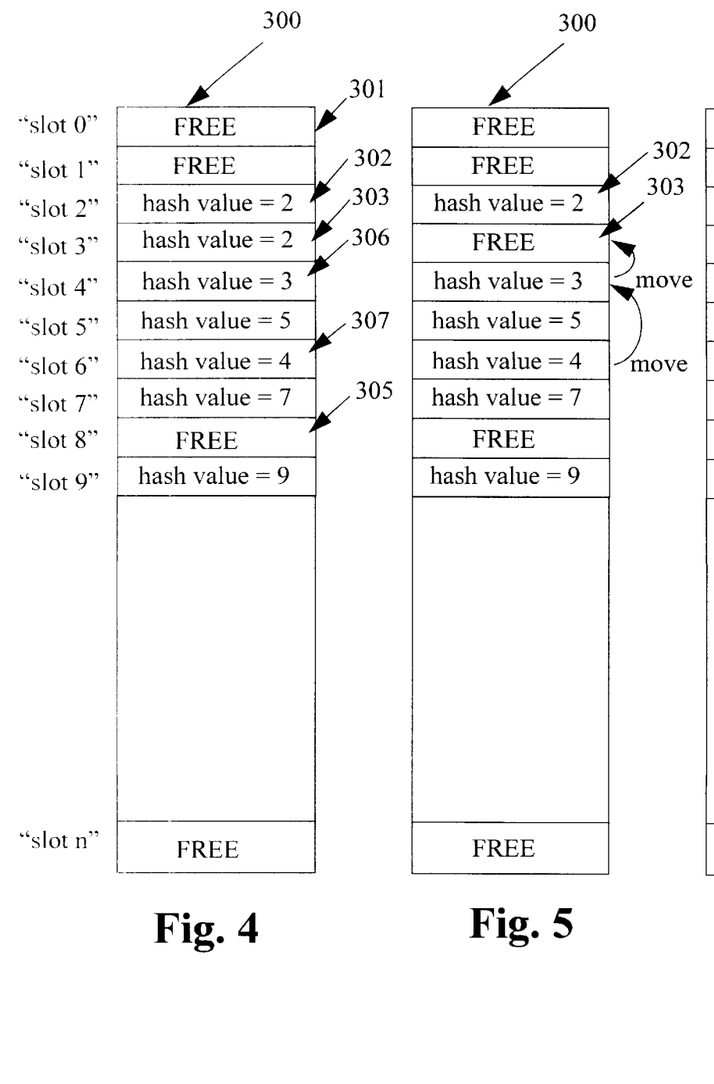
FIGS. 4, 5 and 6 show the page table of FIG. 2 and a method of deleting entries of the page table.
Figure 6:
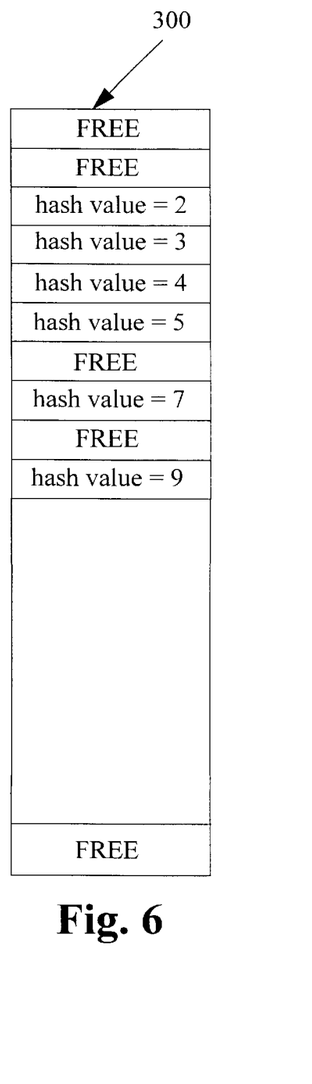

Described with reference to FIGS. 4 to 6, is an example of a page table entry deletion, that is removing a page table entry from a page table. To remove or delete a page table entry the valid flag need only be "unset", indicating that the page table entry at the current location can be overwritten.

As for the page table lookup (described above), when a hash collision occurs, a next page table entry is sought with a virtual page number matching a desired virtual page number, or in a page table entry insertion (also described above) when a hash collision occurs, a next available location is searched by incrementing the hashed index value 202 until a page table entry having an unset valid flag is found. Therefore an entry to be deleted or removed may not be at the hashed address (ie. the page table address 205 resulting from an application of the hash function), but at a page table entry location other than the location referenced by the hashed address.

In FIG. 4, a page table 300 having page table entry locations 301, referred to as "slots" for convenience, are numbered "zero" (0) to "n" representing "n+1" entry locations to the page table 300 having page table address values "0" to "n". A plurality of slots 301 are marked "free" indicating that page table entries at these slots have unset valid flags and the slots of the page table are free to have a page table entry inserted.

In this example a page table address value of zero (0) corresponds to "slot 0", a page table address value of one (1) corresponds to "slot 1", and a page table address value of "n" corresponds to "slot n". Hence, for example, at page table insertion, a hash address value of two (2) would preferably see that a page table entry is inserted into "slot 2" 302, if "slot 2" 302 is available for insertion (ie. valid flag is unset). However, if a hash collision occurs at "slot 2", that is the valid flag is set, then the page table entry is inserted at a next available "slot". The page table in FIG. 4 shows two identical hash table address values at "slot 2" and "slot 3". This indicates that a hash collision had occurred at page table insertion and a first page table entry having a virtual page address, that following the execution of a hash function, resulted in a hash address of two (2) (denoted in figure as hash value=2) and consequently the first page table entry was inserted at "slot 2". Subsequently, a second page table entry also having a hash address of two (2) caused a hash collision because "slot 2" was occupied (valid flag set) by the first page table entry, hence the second page table entry was inserted at the next available slot which happened to be "slot 3". A third page table entry with a corresponding hash address value of three (3) is then inserted at next available slot (slot 4) and continued in this manner. However, if a slot corresponding to a hash address value is available, then the corresponding slot is preferred (eg. hash address value of nine is inserted at "slot 9" which at the time of the insertion request was available).

Referring now to FIG. 5 it is desired to delete, or remove, from the page table of FIG. 4 the page table entry at "slot 3" 303. To delete this entry, the valid flag for the page table entry in "slot 3" 303 is changed from "set" to "unset" and slot 3 is therefore freely available to be overwritten (ie. free). However, as described previously an unset valid flag of a page table entry can terminate a page table lookup, therefore page table entries in slots greater than "slot 3" which were inserted into a high "slot number" as a result of a hash collision, and typically up to a first slot marked "free" 305, are shuffled up the page table 300 of the present example. The page table entries are shuffled up preferably in a manner so that each hash address value corresponds to a preferred slot. For example, FIG. 6 illustrates a preferred arrangement of page table entries of FIG. 4 following the removal (deletion) of the page table entry in "slot 3" of FIG. 4. That is a page table entry at "slot 4" 306 of FIG. 4 having a hash address value of three (3) is moved to "slot 3" and a page table entry at "slot 6" 307 is moved to "slot 4" to result in the arrangement of FIG. 6.

A page table should be consistent at substantially all times when a page table lookup is in progress, yet the page table cannot be automatically updated (ie. instantaneously) because a page table entry typically requires multiple accesses to be performed in an update operation (eg. move operation) on a page table entry. As a result, a page table lookup in progress while an update operation is being performed on a page table entry may result in the page table entry not being located by the lookup. Further, it is preferred that system software or hardware be permitted to access a page table while the page table is being updated.

Consequently, before a page table entry is to be moved from a first slot to a second slot (destination slot) as in the illustrated example of FIG. 5, a virtual address that provides a hash value corresponding to the destination slot is changed to an unused address (ie. a virtual address which would otherwise never appear in the page table) so that a page table lookup on the destination slot is not attempted while the page table entry and in particular while the physical address of a page table entry is being written to the destination slot.

An alternative to using an "unused address" to prevent a page table lookup from utilizing an existing page table entry in a destination slot, designated for a page table entry move, is to further include to all page table entries of a page table an additional access protection flag. The additional access protection flag, when set for a current page table entry, allows a page table lookup process to ignore the current page table entry and continue with the page table lookup in progress.

Figure 7:
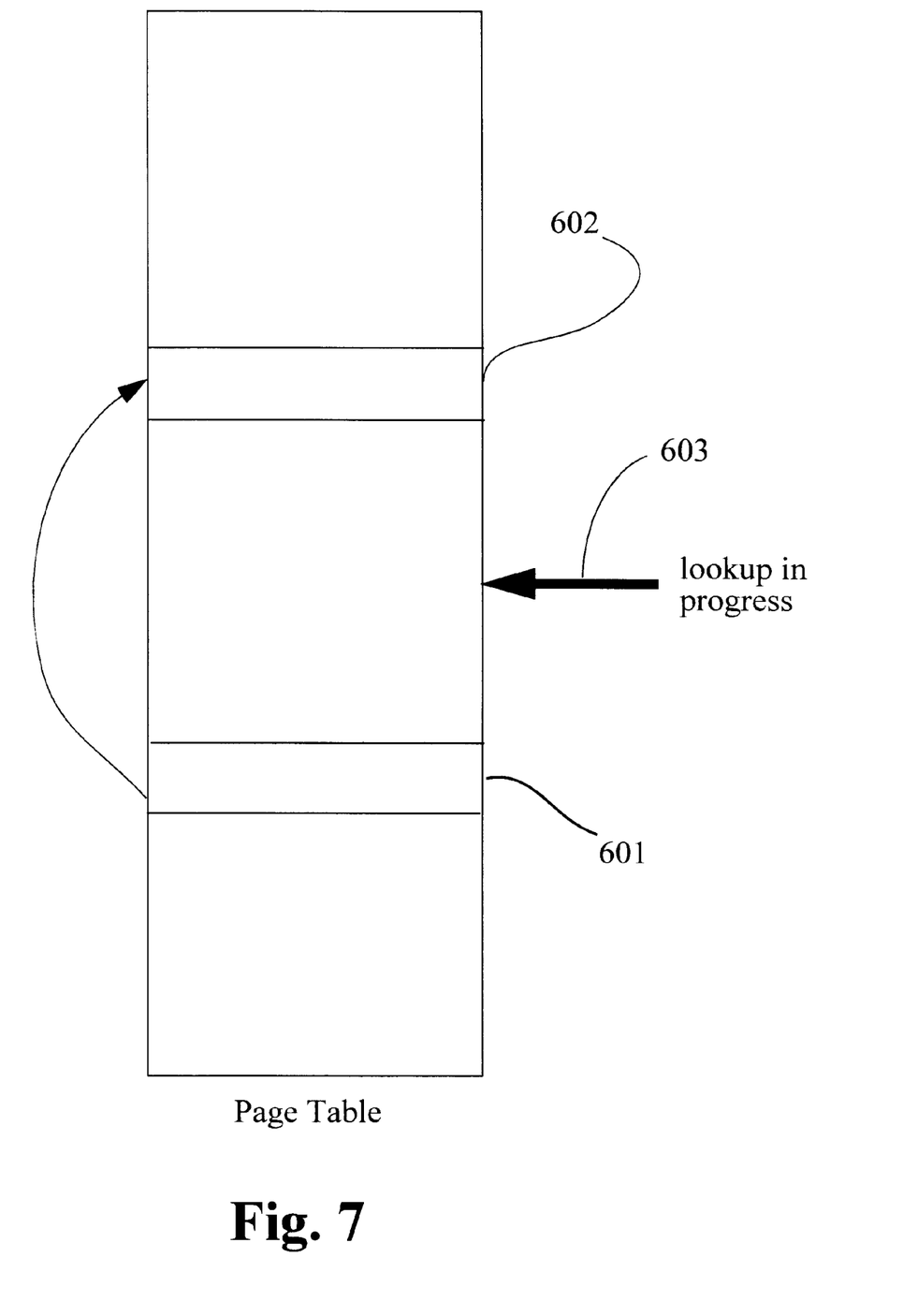
FIG. 7 illustrates a schematic of a page table and the process of moving an entry of the table in accordance with a preferred embodiment of the present invention.

When a current page table entry is moved up, it is desirable for the MMU 90 to know that a page table lookup on the current page table entry is not in progress at a time when a virtual address of a destination slot is changed to an unused address (ie. while a page table entries are being moved) or a valid flag of a page table entry is to be unset. While a coincidental occurrence of a page table lookup on an entry being moved is rare, if a page table lookup is being performed for the current page table entry being moved then the lookup on the current entry is completed before the current page table entry is moved. This is illustrated in FIG. 7. As shown, a page table entry 601 to be moved to another page table entry location (slot) 602, while a page table lookup 603 is progressing towards and looking for the page table entry 601, then the search for the page table entry is allowed to complete before the page table entry 601 is moved. Following a successful page table lookup (ie. a lookup not resulting in a page fault) a page table entry is updated in a TLB, as described above, therefore a need to access the same page table entry in the immediate near future is considerably reduced. A page table entry, following a successful page table lookup on the entry, can be moved with a high probability that an immediate page table lookup on the same entry will not be performed while a move of the page table entry is in progress.

In another embodiment of the present invention a page table entry deletion is substantially as described above, however at a coincidental occurrence of a page table lookup on a page table entry about to be moved from a first page table entry location (a first slot) to a second page table entry location (a second slot), the completion of the move of the page table entry is delayed for a predetermined longest possible time a page table lookup takes to complete. Typically, a move operation on a page table entry comprises the steps of deleting a first page table entry from a first slot, copying a second page table entry from a second slot in the first slot and deleting the second page table entry, thereby effectively moving the second page table entry from the second slot to the first slot.

Figure 10:
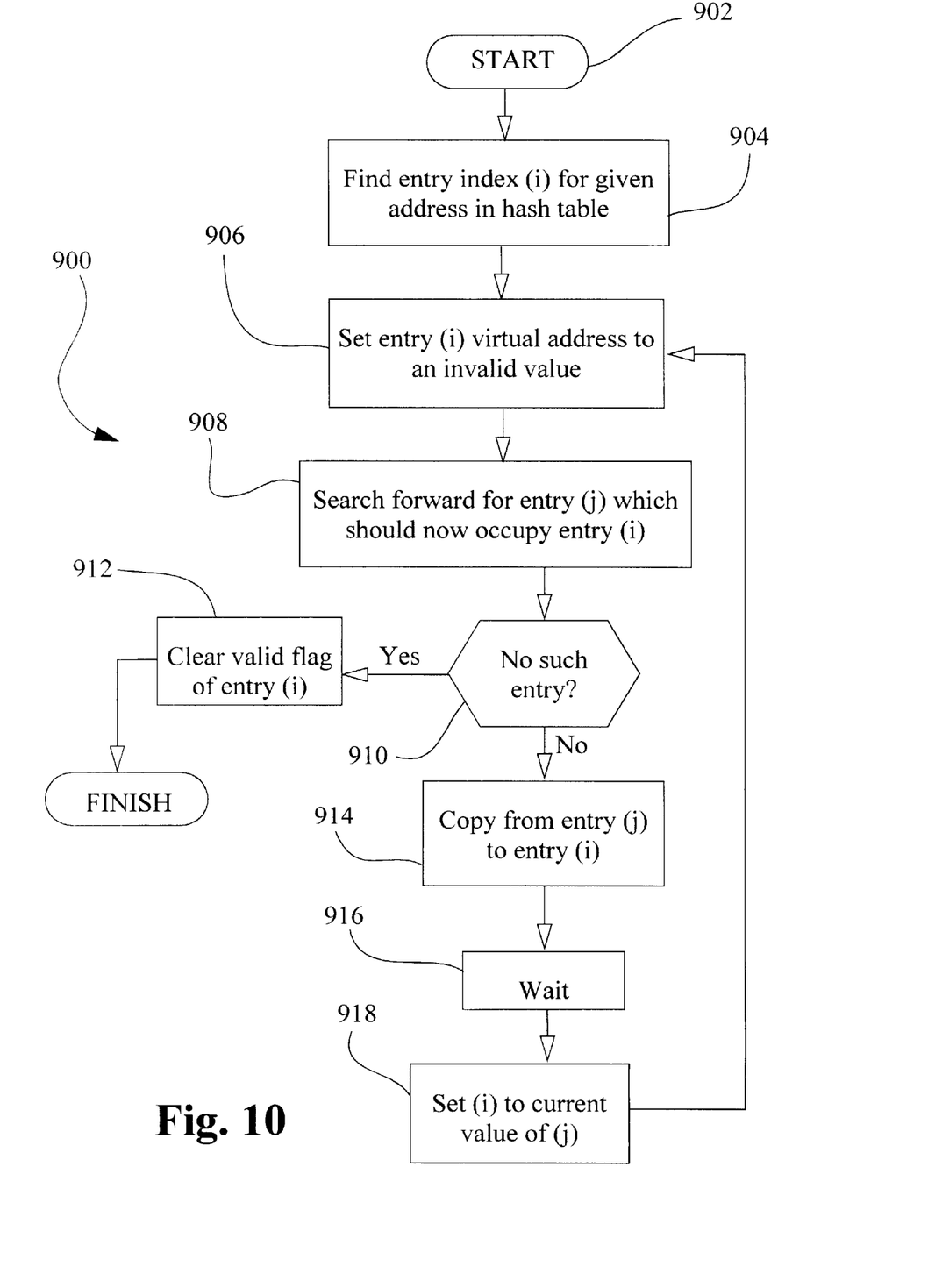
FIG. 10 is a flow chart depicting a page table deletion using the arrangement of FIGS. 2 and 3.

The processes described above with reference to FIGS. 4 to 7 are summarised by the process 900 depicted in FIG. 10. A removal or deletion commences at an entry point 902 which passes to step 904 which locates the entry for the index value (i) in the hash table. Once this is done, step 906 sets the virtual address at the entry to an invalid value. Step 908 then conducts a search further into the page table for another entry (j) to occupy entry (i). If there is no such entry, determined at step 910, the valid flag of the entry at index (i) is cleared, and the deletion is finished. If there is such an entry, the entry at index (j) is copied to index (i) at step 914. A wait step 916 is then entered which allows the MMU 90 to a coincidental page table lookup. When the maximum time required for a lookup has transpired, step 918 sets the index (i) to the current value of (j) and returns control to step 906.

In each of the above embodiments, when a page table entry is deleted (or removed) a corresponding TLB entry (if any) must be invalidated to prevent the MMU 90 from accessing the deleted page table entry via the TLB. To invalidate a TLB entry, a valid flag for each TLB entry to be invalidated is unset and therefore the TLB location of the invalidated TLB entry is free to be subsequently overwritten. Normally, when all page table entries are removed or a page table is replaced in physical memory, all TLB entries are invalidated by an invalidation cycle which unsets valid flags of all the entries of the TLB.

A pseudo-code for a page table entry deletion is provided in an attached Appendix for the preferred embodiment (option 1) and the other embodiment (option 2). The Appendix is indicative of the preferred embodiment being operable on computer systems such as IBM PC/AT devices, compatibles thereof, as well as other computer systems. Typically the preferred embodiment is implement by software that may be sourced from a computer readable medium such as a disk device, tape or a computer network, such as the Internet.

The foregoing describes the preferred embodiment of the present invention, and modifications obvious to those skilled in the art can be made without departing from the scope of the present invention.

APPENDIX

This Appendix provides pseudo code for a page table deletion process in accordance with the preferred (option 1) and other (option 2) embodiments of the present invention.
Apply a hash function to a virtual page address corresponding to the page table entry and find entry in page table;
do
    search for a virtual address which hashes to a slot whose page table entry is to be deleted (first page table entry)
    if found
        Set virtual address of page table entry to be deleted to an illegal address, so the MMU skips this entry (first page table entry)
        copy the physical address of a second page table entry into a corresponding position of the first page table entry (i.e. over-write)
        copy the virtual address and valid flag bit(s) of the second page table entry into a corresponding position of the first page table entry (i.e. over-write)
        if (option 1) MMU is currently doing a lookup on a virtual address referenced in a second page table entry
        then wait
            (option 1) until the MMU has completed the lookup
        fi
        (option 2) until the longest possible time taken for a lookup
        delete the second page table entry on next iterative loop.
    fi
while an entry still needs to be deleted
Set virtual address of second page table entry to Null, unset valid flag.
Set physical address of second page table entry to Null.

What is claimed is:

1. A method of deleting or moving a current page table entry value of page table without requiring suspension of a search process looking for a predetermined page table entry value of the page table, said method comprising the steps of:
    (a) determining whether the current page table value is the predetermined page table entry value;
    (b) deleting or moving the current page table entry value in the event that the current page table entry value is not the predetermined page table entry value; and
    (c) waiting until said search process has completed looking for the predetermined page table entry value before deleting or moving the current page table entry value, in the event that the current page table entry value is the predetermined page table entry value.

2. A method according to claim 1, wherein the page table is an inverted page table or hash page table.

3. A method according to claim 1, wherein moving the current page table entry value further includes copying the current page table entry from a current page table location to a destination page table location, and deleting the current page table entry from a current page table location.

4. A method according to claim 1, wherein said page table is stored in random access memory (RAM).

5. A method according to claim 1, wherein said page table entry value is stored in secondary memory.

6. A method of deleting or moving a current page table entry value of a page table, which page table is an inverted page table or hash page table, without requiring suspension of a search process looking for a predetermined page table entry value of the page table, said method comprising the steps of:
    (a) determining whether the current page table value is the predetermined page table entry value;
    (b) deleting or moving the current page table entry value in the event that the current page table entry value is not the predetermined page table entry value; and
    (c) waiting until said search process has completed looking for the predetermined page table entry value before deleting or moving the current page table entry value, in the event that the current page table entry value is the predetermined page table entry value,
    wherein step (a) comprises the sub-steps of:
    (aa) generating a hash index value from a given address of the current page table value;
    (ab) assessing whether the hash index value is valid;
    (ac) if the hash index value is valid, comparing a virtual address derived from the hash index value to the given page address of the current page table entry value; and
    (ad) if the comparison of step (ac) reveals that the addresses are not equal, incrementing the index value and returning to step (aa).

7. A method according to claim 6 comprising the further step of:
    (ae) if the comparison of step (ac) reveals the addresses are equal, emitting the physical address corresponding to the hash index value to complete step (a).

8. A method according to claim 7 comprising the further step, immediately following step (ac), of:
    (af) if the hash index value is not valid, emitting a page fault to complete step (a).

9. A method according to claim 6 comprising the further step, in the event of the hash index value assessed at step (ab) is invalid, or the comparison of step (ac) revealing the addresses are equal, of:
    (ag) setting into the virtual address accessed via the hash index value, the virtual address, the physical address and a valid flag.

10. A method of deleting or moving a current page table entry value of a page table without requiring suspension of a search process looking for a predetermined page table entry value of the page table, said method comprising the steps of:
    (a) determining whether the current page table value is the predetermined page table entry value;
    (b) deleting or moving the current page table entry value in the event that the current page table entry value is not the predetermined page table entry value; and
    (c) waiting until said search process has completed looking for the predetermined page table entry value before deleting or moving the current page table entry value, in the event that the current page table entry value is the predetermined page table entry value,
    wherein steps (b) and (c) comprise the sub-steps of:
    (i) locating current entry index value for a given address in a hash table;

(ii) setting the virtual address accessed by the entry index value to an invalid value;

(iii) searching through the page table to identify a new entry index value which should replace the current entry index value;

(iv) if no such entry is located at step (iii), clearing a valid flag for the current entry index value to thereby complete steps (b) and (c);

(v) if there is such an entry, copy the new entry index value to the current entry index value;

(vi) wait a predetermined period of time; and (vii) set the current index value to that of the new index value, and return to step (ii).

11. A method of deleting or moving a current page table entry value of a page table in a computer system without requiring suspension of a search process looking for a page table entry value of the page table, said method comprising the steps of:

(a) determining whether said search process looking for a page table entry value is in progress;

(b) deleting or moving the current page table entry in the event that said search process is not in progress; and (c) waiting for a predetermined time before deleting or moving the current page table entry value, in the event that said search process looking for a page table entry value is in progress.

12. A method according to claim 11, wherein the page table is an inverted page table or hash page table.

13. A method according to claim 11, wherein moving the current page table entry value further includes copying the current page table entry from a current page table location to a destination page table location, and deleting the current page table entry from a current page table location.

14. A method according to claim 11, wherein said page table is stored in random access memory (RAM).

15. A method according to claim 11, wherein said page table entry value is stored in secondary memory.

16. A method of deleting or moving a current page table entry value of a page table, which page table is an inverted page table or hash page table, in a computer system without requiring suspension of a search process looking for a page table entry value of the page table, said method comprising the steps of:

(a) determining whether said search process looking for a page table entry value is in progress;

(b) deleting or moving the current page table entry in the event that said search process is not in progress; and (c) waiting for a predetermined time before deleting or moving the current page table entry value, in the event that said search process looking for a page table entry value is in progress, wherein step (a) comprises the sub-steps of:

(aa) generating a hash index value from a given address of the current page table value;

(ab) assessing whether the hash index value is valid;

(ac) if the hash index value is valid, comparing a virtual address derived from the hash index value to the given page address of the current page table entry value; and (ad) if the comparison of step (ac) reveals that the addresses are not equal, incrementing the index value and returning to step (aa).

17. A method according to claim 16 comprising the further step of:

(ae) if the comparison of step (ac) reveals the addresses are equal, emitting the physical address corresponding to the hash index value to complete step (a).

18. A method according to claim 17 comprising the further step, immediately following step (ac), of:

(af) if the hash index value is not valid, emitting a page fault to complete step (a).

19. A method according to claim 16 comprising the further step, in the event of the hash index value assessed at step (ab) is invalid, or the comparison of step (ac) revealing the addresses are equal, of:

(ag) setting into the virtual address accessed via the hash index value, the virtual address, the physical address and a valid flag.

20. A method of deleting or moving a current page table entry value of a page table in a computer system without requiring suspension of a search process looking for a page table entry value of the page table, said method comprising the steps of:

(a) determining whether said search process looking for a page table entry value is in progress;

(b) deleting or moving the current page table entry in the event that said search process is not in progress; and (c) waiting for a predetermined time before deleting or moving the current page table entry value, in the event that said search process looking for a page table entry value is in progress:

wherein steps (b) and (c) comprise the sub-steps of:

(i) locating a current entry index value for a given address in a hash table;

(ii) setting the virtual address accessed by the entry index value to an invalid value;

(iii) searching through the page table to identify a new entry index value which should replace the current entry index value;

(iv) if no such an entry is located at step (iii), clearing a valid flag for the current entry index value to thereby complete steps (b) and (c);

(v) if there is such an entry, copy the new entry index value to the current entry index value;

(vi) wait a predetermined period of time; and (vii) set the current index value to that of the new index value, and return to step (ii).

21. A computer product having a computer readable medium having a computer program recorded thereon for deleting or moving a current page table entry value of a page table without requiring suspension of a search process looking for a predetermined page table entry value of the page table, said computer program product comprising:

means for determining whether the current page table value is the predetermined page table entry value;

means for deleting or moving the current page table entry value in the event that the current page table entry value is not the predetermined page table entry value; and means for waiting until said search process has completed looking for the predetermined page table entry value before deleting or moving the current page table entry value, in the event that the current page table entry value is the predetermined page table entry value.

22. A computer product having a computer readable medium having a computer program recorded thereon for deleting or moving a current page table entry value of a page table in a computer system without requiring suspension of a search process looking for a page table entry value of the page table, said computer program product comprising:

means for determining whether said search process looking for a page table entry value is in progress;

means for deleting or moving the current page table entry in the event that said search process is not in progress; and means for waiting for a predetermined time before deleting or moving the current page table entry value, in the event that said search process looking for a page table entry value is in progress.

23. Apparatus for deleting or moving a current page table entry value of a page table without requiring suspension of a search process looking for a predetermined page table entry value of the page table, said apparatus comprising:

means for determining whether the current page table value is the predetermined page table entry value;

means for deleting or moving the current page table entry value in the event that the current page table entry value is not the predetermined page table entry value; and means for waiting until said search process has completed looking for the predetermined page table entry value before deleting or moving the current page table entry value, in the event that the current page table entry value is the predetermined page table entry value.

24. Apparatus for deleting or moving a current page table entry value of a page table in a computer system without requiring suspension of a search process looking for a page table entry value of the page table, said apparatus comprising:

means for determining whether said search process looking for a page table entry value is in progress;

means for deleting or moving the current page table entry in the event that said search process is not in progress; and means for waiting for a predetermined time before deleting or moving the current page table entry value, in the event that said search process looking for a page table entry value is in progress.

25. A computer system for deleting or moving a current page table entry value of a page table without requiring suspension of a search process looking for a predetermined page table entry value of the page table, said computer system comprising:

means for determining whether the current page table value is the predetermined page table entry value;

means for deleting or moving the current page table entry value in the event that the current page table entry value is not the predetermined page table entry value; and means for waiting until said search process has completed looking for the predetermined page table entry value before deleting or moving the current page table entry value, in the event that the current page table entry value is the predetermined page table entry value.

26. A computer system for deleting or moving a current page table entry value of a page table without requiring suspension of a search process looking for a page table entry value of the page table, said computer system comprising:

means for determining whether said search process looking for a page table entry value is in progress;

means for deleting or moving the current page table entry in the event that said search process is not in progress; and means for waiting for a predetermined time before deleting or moving the current page table entry value, in the event that said search process looking for page table entry value is in progress.

* * * * *

UNITED STATES PATENT AND TRADEMARK OFFICE
CERTIFICATE OF CORRECTION

PATENT NO. : 6,145,064
DATED : November 7, 2000
INVENTOR(S) : Timothy Merrick Long et al.

It is certified that error appears in the above-identified patent and that said Letters Patent is hereby corrected as shown below:

Column 3:
Line 63, "an" should read -- a --.

Column 4:
Line 23, "look-up." should read -- lookup. --; and
Line 43, "714." should read -- at step 714. --.

Column 5:
Line 16, "upper" should read -- highest --; and
Line 55, "which ever" should read -- whichever --.

Column 6:
Line 48, ""0 "" should read -- "0" --.

Column 9:
Line 2, "implement" should read -- implemented --; and
Line 47, "page" should read -- a page --.

Signed and Sealed this

Eleventh Day of September, 2001

Attest:

NICHOLAS P. GODICI
Attesting Officer
*Acting Director of the United States Patent and Trademark Office*

UNITED STATES PATENT AND TRADEMARK OFFICE
CERTIFICATE OF CORRECTION

PATENT NO.      : 6,145,064
DATED           : November 7, 2000
INVENTOR(S)     : Timothy Merrick Long et al.

Page 1 of 1

It is certified that error appears in the above-identified patent and that said Letters Patent is hereby corrected as shown below:

<u>Title page,</u>
Item [73], should read as follows:
-- [73] Assignees: Canon Information Systems Research Australia Pty Ltd. New south Wales, Australia; Canon Kabushiki Kaisha, Tokyo, Japan --

Signed and Sealed this

Thirteenth Day of May, 2003

JAMES E. ROGAN
*Director of the United States Patent and Trademark Office*

UNITED STATES PATENT AND TRADEMARK OFFICE
CERTIFICATE OF CORRECTION

| | | |
|---|---|---|
| PATENT NO. | : 6,145,064 | Page 1 of 1 |
| APPLICATION NO. | : 08/917034 | |
| DATED | : November 7, 2000 | |
| INVENTOR(S) | : Timothy Merrick Long et al. | |

It is certified that error appears in the above-identified patent and that said Letters Patent is hereby corrected as shown below:

<u>Title page,</u>
Item [73], should read as follows:
-- [73] Assignee: Canon Kabushiki Kaisha, Tokyo, Japan --

This certificate supersedes Certificate of Correction issued May 13, 2003.

Signed and Sealed this

First Day of May, 2007

JON W. DUDAS
*Director of the United States Patent and Trademark Office*